United States Patent
Park et al.

(10) Patent No.: US 7,990,936 B2
(45) Date of Patent: Aug. 2, 2011

(54) METHOD AND APPARATUS FOR ACQUIRING IP ADDRESS IN DHCP ENVIRONMENT

(75) Inventors: Soo-hong Park, Yongin-si (KR); Pyung-soo Kim, Seoul (KR); Young-keun Kim, Icheon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 11/212,783

(22) Filed: Aug. 29, 2005

(65) Prior Publication Data

US 2006/0050673 A1    Mar. 9, 2006

(30) Foreign Application Priority Data

Sep. 3, 2004   (KR) .......................... 10-2004-0070236

(51) Int. Cl.
*H04W 4/00* (2009.01)
(52) U.S. Cl. ........ 370/338; 370/328; 370/329; 370/330; 370/351; 370/389; 455/436; 455/437; 455/438; 455/439; 455/432.1; 709/203; 709/226; 709/227; 709/228; 709/229; 709/238
(58) Field of Classification Search ........... 455/41.2, 455/414.1, 432.1, 436–444; 370/338, 389, 370/395.5, 395.52, 471, 475, 229, 238, 474, 370/352, 328, 392, 400, 401, 473, 329, 330, 370/331, 351, 431; 709/201, 203, 223, 226, 709/227, 228, 229, 245, 238, 239, 202, 230, 709/217, 218, 225
See application file for complete search history.

(56) References Cited

U.S. PATENT DOCUMENTS

| | | | | |
|---|---|---|---|---|
| 6,073,178 A | * | 6/2000 | Wong et al. | 709/229 |
| 6,473,413 B1 | * | 10/2002 | Chiou et al. | 370/331 |
| 6,510,153 B1 | * | 1/2003 | Inoue et al. | 370/354 |
| 7,016,353 B2 | * | 3/2006 | Proctor et al. | 370/392 |
| 7,016,682 B2 | * | 3/2006 | Won et al. | 455/445 |
| 7,236,476 B2 | * | 6/2007 | Banerjee et al. | 370/331 |
| 7,254,119 B2 | * | 8/2007 | Jiang et al. | 370/328 |
| 7,315,519 B2 | * | 1/2008 | Sarikaya et al. | 370/310 |
| 7,356,009 B1 | * | 4/2008 | Meier et al. | 370/338 |

(Continued)

FOREIGN PATENT DOCUMENTS

KR    1020020023917    3/2002

(Continued)

OTHER PUBLICATIONS

Chinese Office Action issued in corresponding Chinese Patent Application No. 200510095855.8.

(Continued)

*Primary Examiner* — Olumide T Ajibade Akonai
(74) *Attorney, Agent, or Firm* — Staas & Halsey LLP (57) ABSTRACT

An apparatus for and method of acquiring an address in a Dynamic Host Configuration Protocol (DHCP) environment in a wireless LAN. The method includes: sensing that a mobile node has moved from a first network to a second network; transmitting a frame requesting association with the second network to an access point managing the second network after sensing that the mobile node has moved from the first network to the second network; and receiving a message containing an address assigned to the mobile node from the access point having received the transmitted frame. Accordingly, the mobile node can promptly acquire an IP address without an additional request.

20 Claims, 7 Drawing Sheets

U.S. PATENT DOCUMENTS

| | | | | |
|---|---|---|---|---|
| 7,694,017 B2 * | 4/2010 | Saitoh | | 709/245 |
| 7,882,169 B1 * | 2/2011 | Droms et al. | | 709/203 |
| 2003/0142642 A1 | 7/2003 | Agrawal et al. | | 370/328 |

FOREIGN PATENT DOCUMENTS

| | | |
|---|---|---|
| KR | 1020020055848 | 7/2002 |
| KR | 1020030007264 | 1/2003 |
| KR | 1020030029268 | 4/2003 |
| KR | 10-2004-0040093 | 5/2004 |
| KR | 10-2004-0076509 | 9/2004 |

OTHER PUBLICATIONS

Chinese Office Action issued in corresponding Chinese Patent Application No. 200510095855.8, Nov. 7, 2008.

Chinese Office Action issued in corresponding Chinese Patent Application No. 200510095855.8 dated Nov. 7, 2008.

Korean Office Action dated Feb. 24, 2006 in Korean Application No. 10-2004-0070236.

* cited by examiner

| UNSOLICITED _DHCPACK (401) | HTYPE(402) | HLEN(403) | HOPS(404) |
|---|---|---|---|
| XID (405) ||||
| SECS (406) || FLAGS (407) ||
| CIADDR (408) ||||
| YIADDR (409) ||||
| SIADDR (410) ||||
| GIADDR (411) ||||
| CHADDR (412) ||||
| SNAME (413) ||||
| FILE (414) ||||
| OPTIONS (415) ||||

METHOD AND APPARATUS FOR ACQUIRING IP ADDRESS IN DHCP ENVIRONMENT

CROSS-REFERENCE TO RELATED APPLICATION

This application claims the priority of Korean Patent Application No. 2004-0070236, filed on Sep. 3, 2004, in the Korean Intellectual Property Office, the disclosure of which is incorporated herein by reference.

BACKGROUND OF THE INVENTION

1. Field of the Invention

The present invention relates to a wireless LAN, and more particularly, to a Dynamic Host Configuration Protocol environment in a wireless LAN.

2. Description of Related Art

As wireless LAN technology has been developed, several types of wireless LAN standards have been introduced. The most widely used of these wireless standards is the IEEE (institute of electrical and electronics engineers) 802.11 wireless LAN standard. Further, a DHCP (Dynamic Host Configuration Protocol) defined in RFC (Request for Comments) 1531 has been generally used as a standard for assigning an IP address to a mobile node in a wireless LAN environment based on the IEEE 802.11.

Figure 1:
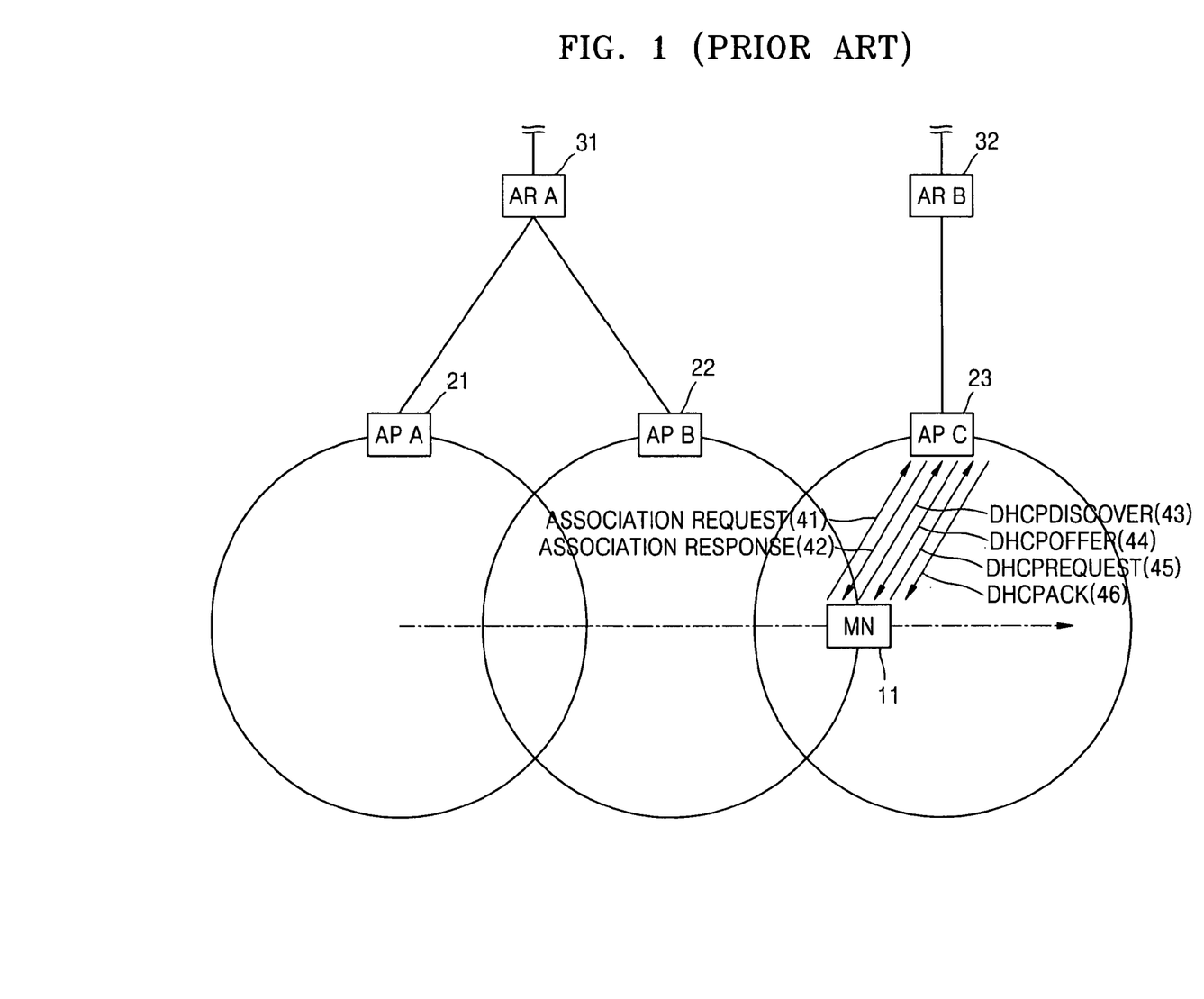
FIG. 1 illustrates the configuration of a conventional communication system.

FIG. 1 illustrates the configuration of a conventional communication system. Referring to FIG. 1, the conventional communication system includes a mobile node 11, an access point A 21, an access point B 22, an access point C 23, an access router A 31, and an access router B 32.

The mobile node 11 freely moves from network to network and is equipped with a wireless LAN function and a DHCP client function. The access point A 21, the access point B 22, and the access point C 23 are equipped with wireless LAN and wired LAN functions, and communicate wirelessly with the mobile node 11 existing in the network managed by the access points A 21, B 22, and C 23. The access points A 21 and B 22 communicate with the access router A 31 managing the access points A 21 and B 22, and the access point C 23 communicates with the access router B 32 managing the access point C 33 via wire. Accordingly, the access points A 21, B 22 and C 23 connect the mobile node 11 to the access routers A 31 and B 32. In particular, the access point C 26 is equipped with a DHCP server function. The access router A 33 and the access router B 34 are equipped with a wire LAN function and a routing function, and communicate with an access point in a subnet that the access router A 33 or B 34 independently manages by wire.

It is assumed that the mobile node 11 passes sequentially through networks managed by the access point A 21, the access point B 22, and the access point C 23, as illustrated in FIG. 1.

Since the access router managing the access point A 21 and the access router managing the access point B 22 are the same router, i.e. the access router A 31 when the mobile node 11 moves from a network the access point A 21 manages to a network the access point B 22 manages, a subnet is not changed.

Since the access router managing the access point B 22 and the access router managing the access point C 23 are the different routers, i.e. the access router A 31, the access router B 32 when the mobile node 11 moves from the network the access point B 22 manages to the network the access point C 23 manages, a subnet is changed, and a new IP address to be used in the new subnet is required. The process of acquiring an IP address in a new subnet will now be described.

When a subnet where the mobile node 11 exists is changed, that is, when the mobile node 11 moves from a network the access point B 22 manages to a network the access point C 23 manages, the mobile node 11 associates with the access point C 23 by transmitting an association request frame 41 to and receiving an association response frame 42 from the access point C 23 based on the IEEE 802.11 wireless LAN standard.

When the mobile node 11 has become associated with the access point C 23, the mobile node 11 searches for a DHCP server by broadcasting a DHCPDISCOVER message based on the DHCP defined in RFC 1531.

When access points corresponding to the DHCP server receive the broadcasted DHCPDISCOVER message from the mobile node 11, the access points transmit DHCPOFFER messages to the mobile node 11. The mobile node 11 selects the access point C 23 among the access points providing the DHCPOFFER messages, and requests an IP address by broadcasting a DHCPREQUEST message indicating that the access point C 23 was selected.

When the access point C 23 receives the broadcasted DHCPREQUEST message from the mobile node 11, the access point C 23 transmits a DHCPACK message containing an IP address to the mobile node 11. The mobile node 11 receives the DHCPACK message from the access point C 23, and uses the IP address contained in the DHCPACK message as its own IP address.

As described above, a total of four messages must be transmitted and received to acquire an IP address based on the conventional DHCP, and thus, it takes much time for the mobile node to be assigned a new IP address. In addition, since the access point corresponding to a DHCP server can respond and assign the IP address to the mobile node, only after a mobile node corresponding to a DHCP client sends a request to an access point, the access point cannot assign IP addresses independently.

BRIEF SUMMARY

An aspect of the present invention provides methods and apparatuses allowing a mobile node to acquire an IP address required when the mobile node moves between networks and an access point to independently assign the IP addresses.

An aspect of the present invention also provides computer readable recoding media storing computer programs for implementing these methods in computers.

According to an aspect of the present invention, there is provided a method of acquiring an address, the method including: sensing that a mobile node has moved from a first network to a second network; transmitting a frame requesting association with the second network to an access point managing the second network after sensing that the mobile node has moved from the first network to the second network; and receiving a message containing an address assigned to the mobile node from the access point having received the transmitted frame.

According to another aspect of the present invention, there is provided a mobile node including: a network change sensing unit sensing when the mobile node has moved from a first network to a second network; a frame transmitting unit transmitting a frame requesting association with the second network to an access point managing the second network when the network change sensing unit senses that the mobile node has moved from the first network to the second network; and a message receiving unit receiving a message containing an address assigned to the mobile node from the access point having received the frame transmitted by the frame transmitting unit.

According to yet another aspect of the present invention, there is provided a method of providing an address, the method including: receiving a frame requesting association with a second network from a mobile node which has moved from a first network to the second network; assigning an address of the second network to the mobile node when the frame is received; and transmitting a message containing the assigned address to the mobile node.

According to further aspect of the present invention, there is provided an access point including: a frame receiving unit receiving a frame requesting association with a second network from a mobile node which has moved from a first network to the second network; an address assigning unit assigning an address of the second network to the mobile node when the frame receiving unit receives the frame; and a message transmitting unit transmitting a message containing the address assigned by the address assigning unit to the mobile node.

According to another aspect of the present invention, there is provided a communication system including: a mobile node sensing when a mobile node has moved from a first network to a second network and transmitting a frame requesting association with the second network to an access point managing the second network when the mobile node has sensed that the mobile node has moved from the first network to the second network; and an access point assigning an address of the second network to the mobile node in response to the frame received from the mobile node and transmitting a message containing the assigned address to the mobile node.

According to another aspect of the present invention, there is provided a method of providing network information, the method including: sensing a change of information about a specified network; and transmitting a message including the changed information to a client when the change is sensed.

According to other aspects of the present invention, there are provided computer-readable recording media having embodied thereon computer programs for causing a processor to perform methods of the invention according to the above-described aspects.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
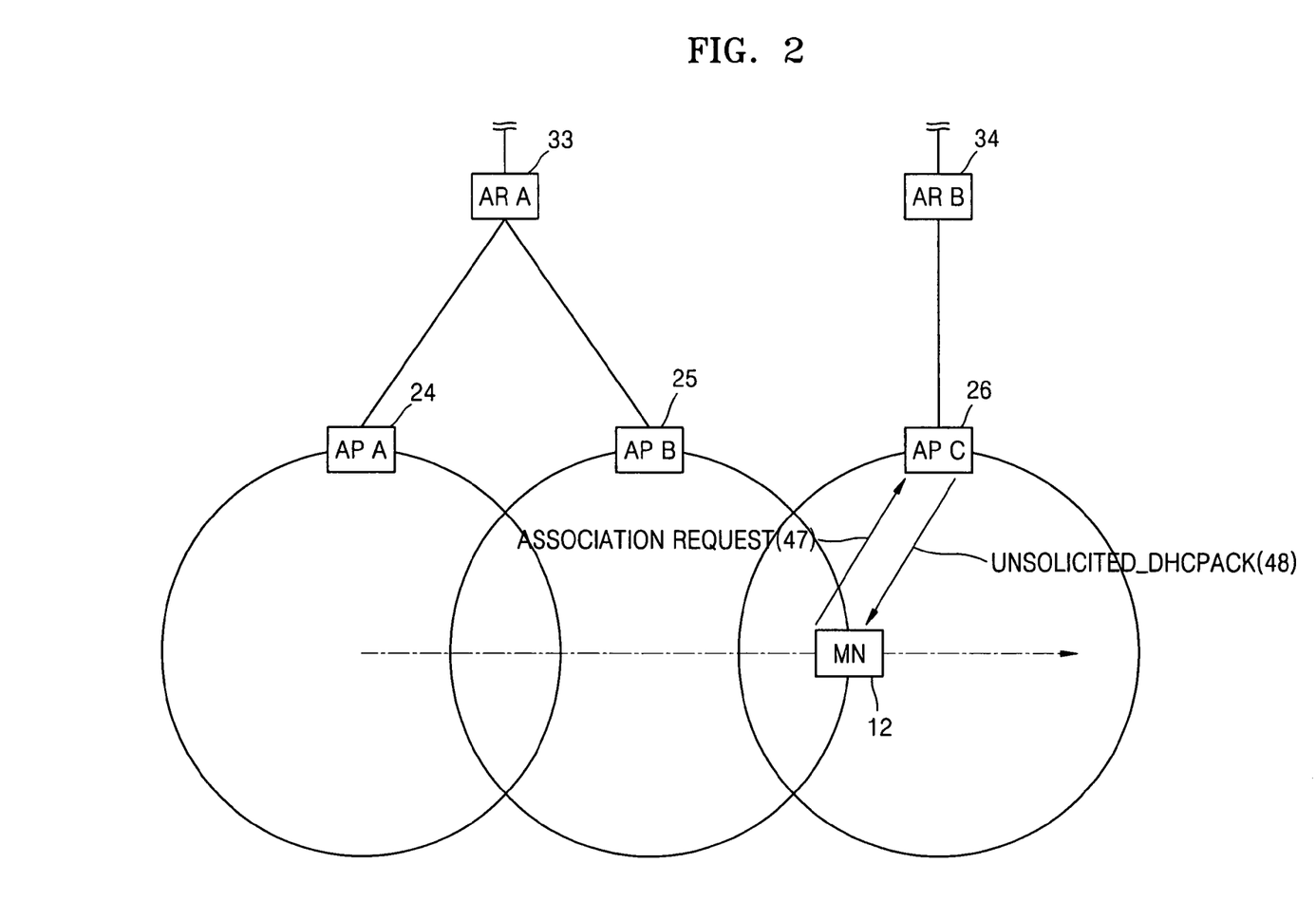
FIG. 2 illustrates the configuration of a communication system according to an embodiment of the present invention.

FIG. 2 illustrates the configuration of a communication system according to an embodiment of the present invention. Referring to FIG. 2, the communication system includes a mobile node 12, an access point A 24, an access point B 25, an access point C 26, an access router A 33, and an access router B 34.

In FIG. 2, the mobile node 12 passes sequentially through networks managed by the access point A 24, the access point B 25, and the access point C 26, in the direction of the arrow in that figure.

The access router A 33 manages the access point A 24 and the access router managing the access point B 25 are the same router, i.e. the access router A 33 when the mobile node 12 moves from a network the access point A 24 manages to a network the access point B 25 manages. Therefore, a subnet is not changed, and thus the present embodiment is not applied.

However, when the mobile node 12 moves from a network the access point B 25 manages to a network the access point C 26 manages, since the access router A 33 managing the access point B 25 and the access router B 34 managing the access point C 26 are different, the subnet is changed, and thus the present embodiment can be applied. The present embodiment, accordingly, will be described with respect to only this case.

The mobile node 12 senses that it has moved from a network the access point B 25 manages to a network the access point C 26 manages, and transmits an association request frame for requesting to associate with the access point C 26 to the access point C 26.

When the access point C 26 receives the association request frame 47 from the mobile node 12, the access point C 26 assigns an IP address in the network managed by the access point C 26 to the mobile node 12 and transmits an Unsolicited_DHCPACK message 48 containing the assigned IP address to the mobile node 12.

The mobile node 12 receives the Unsolicited_DHCPACK message 48 from the access point C 26, and sets the IP address contained in the received Unsolicited_DHCPACK message as its IP address.

As described above, according to the present embodiment, the mobile node 12 can promptly acquire a new IP address without an additional request, thus allowing the IP address to be immediately set.

Figure 3:
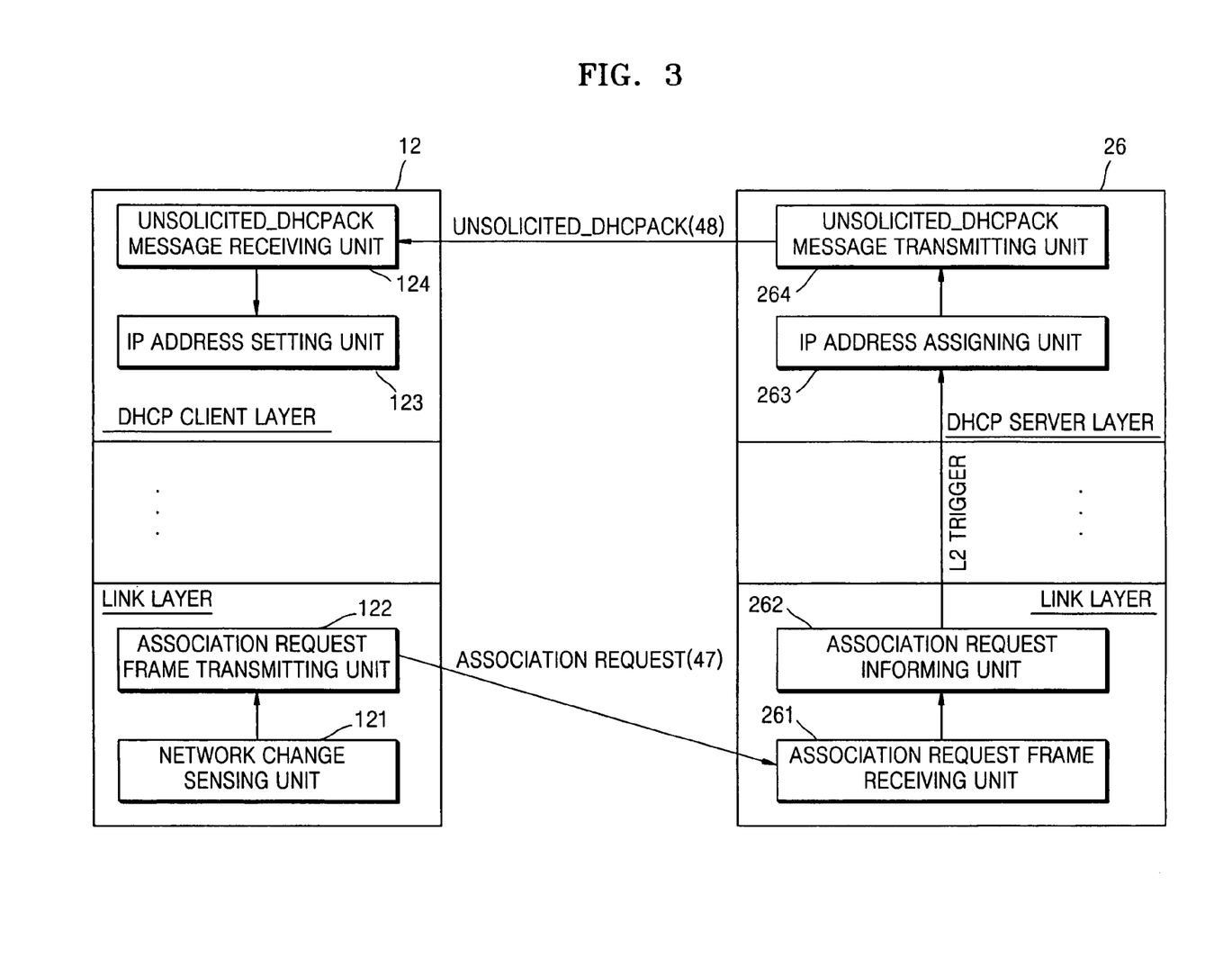
FIG. 3 is a block diagram of a mobile node and an access point C illustrated in FIG. 2.

FIG. 3 is a block diagram of the mobile node 12 and the access point C 26 illustrated in FIG. 2. Referring to FIGS. 2 and 3, the mobile node 12 illustrated in FIG. 2 includes a network change sensing unit 121, an association request frame transmitting unit 122, a DHCPACK message receiving unit 123, and an IP address setting unit 124.

The network change sensing unit 121 senses when the mobile node 12 moves from a network the access point B 25 manages to a network the access point C 26 manages. According to the IEEE 802.11 wireless LAN standard, the process in which a mobile node searches an access point is referred to as scanning, which is classified into passive scanning and active scanning.

In passive scanning, the network change sensing unit 121 receives beacon frames periodically sent by the access point B 25, and senses when the mobile node 12 has moved from a network the access point B 25 manages to a network the access point C 26 manages by checking a network identification contained in the beacon frame, that is, an ID of a BSS (basic service set).

In active scanning, the network change sensing unit 121 receives a probe response frame from the access point B 25 in response to an active request by the mobile node 12, and senses when the mobile node 12 has moved from a network the access point B 25 manages to a network the access point C 26 manages by checking an ID of a BSS contained in the probe response frame.

When the network change sensing unit 121 senses a change of networks, the association request frame transmitting unit 122 transmits an association request frame to the access point C 26 to request association with a network the access point C 26 manages. The association request frame is an association request frame or a reassociation request frame defined by the IEEE 802.11 wireless LAN standard.

The Unsolicited_DHCPACK message receiving unit 123 receives an Unsolicited_DHCPACK message 48 containing an IP address assigned to the mobile node 12 by the access point C 26 having received the association request frame 47 from the association request frame transmitting unit 122. The Unsolicited_DHCPACK message 48 indicates a DHCPACK message sent from the access point C 26 to the mobile node 12 when the DHCPREQUEST message has not been sent from the mobile node 12 to the access point C 26.

Figure 4:
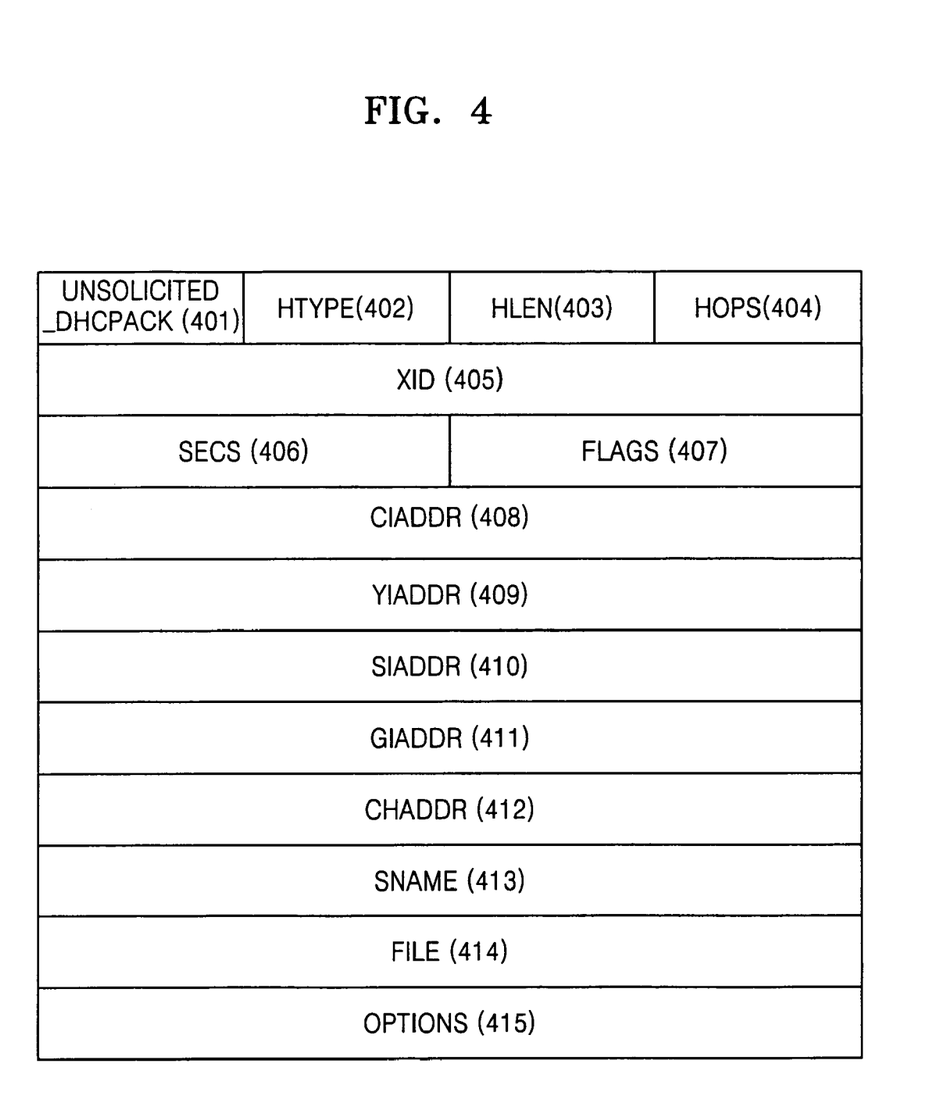
FIG. 4 illustrates a format of an Unsolicited_DHCPACK message shown in FIG. 2.

FIG. 4 is a diagram illustrating a format of the Unsolicited_DHCPACK message 48 according to an embodiment of the present invention. Referring to FIG. 4, the Unsolicited_DHCPACK message 48 includes an Unsolicited_DHCPACK field 401, an htype field 402, an hlen field 403, an hops field 404, an xid field 405, a secs field 406, a flags field 407, a ciaddr field 408, a yiaddr field 409, an siaddr field 410, a giaddr field 411, a chaddr field 412, an sname field 413, a file field 414, and an options field 415.

An OP code indicating the type of the Unsolicited_DHCPACK message is recorded in the Unsolicited_DHCPACK field 401. In general, the Unsolicited_DHCPACK field 401 is called an OP field, and the type of message is indicated by a value recorded in the OP field. In the present embodiment, messages defined by the DHCP, specifically, the dhcpdiscover message, the DHCPOFFER message, the DHCPREQUEST message, and the Unsolicited_DHCPACK message 48, which is different from a DHCPACK message, are newly defined. Accordingly, for convenience, the OP field in which the OP code indicating the message types newly defined in the present embodiment is recorded is referred to as the Unsolicited_DHCPACK field 401.

A value indicating a type of a hardware address of a client is recorded in the htype field 402. A value indicating the length of the hardware address of the client is recorded in the hlen field 403. A value indicating the number of routers the Unsolicited_DHCPACK message 48 passed through is recorded in the hops field 404.

A value for identifying a client is recorded in the xid field 405, and may be the same as the hardware address, which is recorded in the chaddr field 408. In the secs field 406, a value indicating that how long time passes after a client is booted is recorded. In the flags field 407, a value indicating a broadcast and so on is recorded.

In the ciaddr field 408, an IP address of a client is recorded, but the IP address is recorded only when the client knows its own IP address, and is recorded as '0.0.0.0' otherwise. A server records an IP address assigned to a client in the yiaddr field 409 only when '0.0.0.0' is recorded in the ciaddr field 408.

An IP address of a server is recorded in the siaddr field 410. If the Unsolicited_DHCPACK message 48 is transmitted through a gateway, an IP address of the gateway is recorded in the giaddr field 411. A hardware address of a client is recorded in the chaddr field 412.

A host name of a server is recorded in the sname field, a boot file name is recorded in the file field 414, and values of specified option parameters are recorded in the options field 415.

Referring to FIGS. 2 and 3, if an IP address of a network the access point B 25 manages cannot be used in a network the access point C 26 manages, the IP address setting unit 124 sets an IP address contained in the Unsolicited_DHCPACK message 48 received by the Unsolicited_DHCPACK message receiving unit 123 as a new IP address of the mobile node 12. If the IP address of the network the access point B 25 manages can be used in the network the access point C 26 manages, the IP address setting unit 124 discards the IP address contained in the Unsolicited_DHCPACK message 48 received by the Unsolicited_DHCPACK message receiving unit 123.

That is, when the IP address of the network the access point B 25 manages is different from a subnet of an IP address recorded in the yiaddr field 59 of the Unsolicited_DHCPACK message 48, the IP address setting unit 124 sets the IP address recorded in the yiaddr field 59 of the Unsolicited_DHCPACK message 48 as the IP address of the mobile node 12. If the subnet of the IP address of the network the access point B 25 manages is identical with the subnet of the IP address recorded in the yiaddr field 59 of the Unsolicited_DHCPACK message 48, the IP address setting unit 124 discards the IP address recorded in the yiaddr field 59 of the Unsolicited_DHCPACK message 48.

In the present embodiment, since the access router A 33 connected to the access point B 25 and the access router B 34 connected to the access point C 26 are different, the networks the access point B 25 and the access point C 26 manage are included in different subnets. Therefore, an IP address of the network the access point B 25 manages cannot be used in the network the access point C 26 manages.

The access point C 26 illustrated in FIG. 2 includes an association request frame receiving unit 261, an association request informing unit 262, an IP address assigning unit 263, and an Unsolicited_DHCPACK message transmitting unit 264.

A protocol stack of the access point C 26 includes a link layer, a DHCP server layer, and other layers. The link layer is a lower layer, and the DHCP server layer is an upper layer. The association request frame receiving unit 261 and the association request informing unit 262 are included in the link layer, and the IP address assigning unit 263 and the Unsolicited_DHCPACK message transmitting unit 264 are included in the DHCP server layer.

The association request frame receiving unit 261 receives an association request frame 47 requesting association with the network of the access point C 26 from the mobile node 12 moving from the network the access point B 25 manages to the network the access point C 26 manages.

When the association request receiving unit 261 receives the association request frame 47, the association informing unit 262 informs the IP address assigning unit 263 included in the DHCP server layer that the mobile node 12 requests to be associated with the network managed by the access point C 26. The link layer corresponds to a second layer in an OSI (open system interconnection) model. The informing of the upper layer by the lower layer is generally referred to as an L2 trigger. That is, the informing by the association request informing unit 262 corresponds to the L2 trigger.

When the association request informing unit 262 installed on the link layer corresponding to the lower layer informs the IP address assigning unit 263 that the network managed by the access point C 26 is requested to be associated with the mobile node 12, the IP address assigning unit 263 assigns an IP address of the network managed by the access point C 26 to the mobile node 12. The IP address assigning unit 263 assigns the IP address based on the DHCP defined in RFC (request for comments) 1531.

The Unsolicited_DHCPACK message transmitting unit 264 transmits the Unsolicited_DHCPACK message 48 containing the IP address that has been assigned by the IP address assigning unit 263 to the mobile node 12. The Unsolicited_DHCPACK message 48 is a DHCPACK message the access point C 26 transmits to the mobile node 12 when the access point C 26 has not received a DHCPREQUEST message from the mobile node 12.

Figure 5:
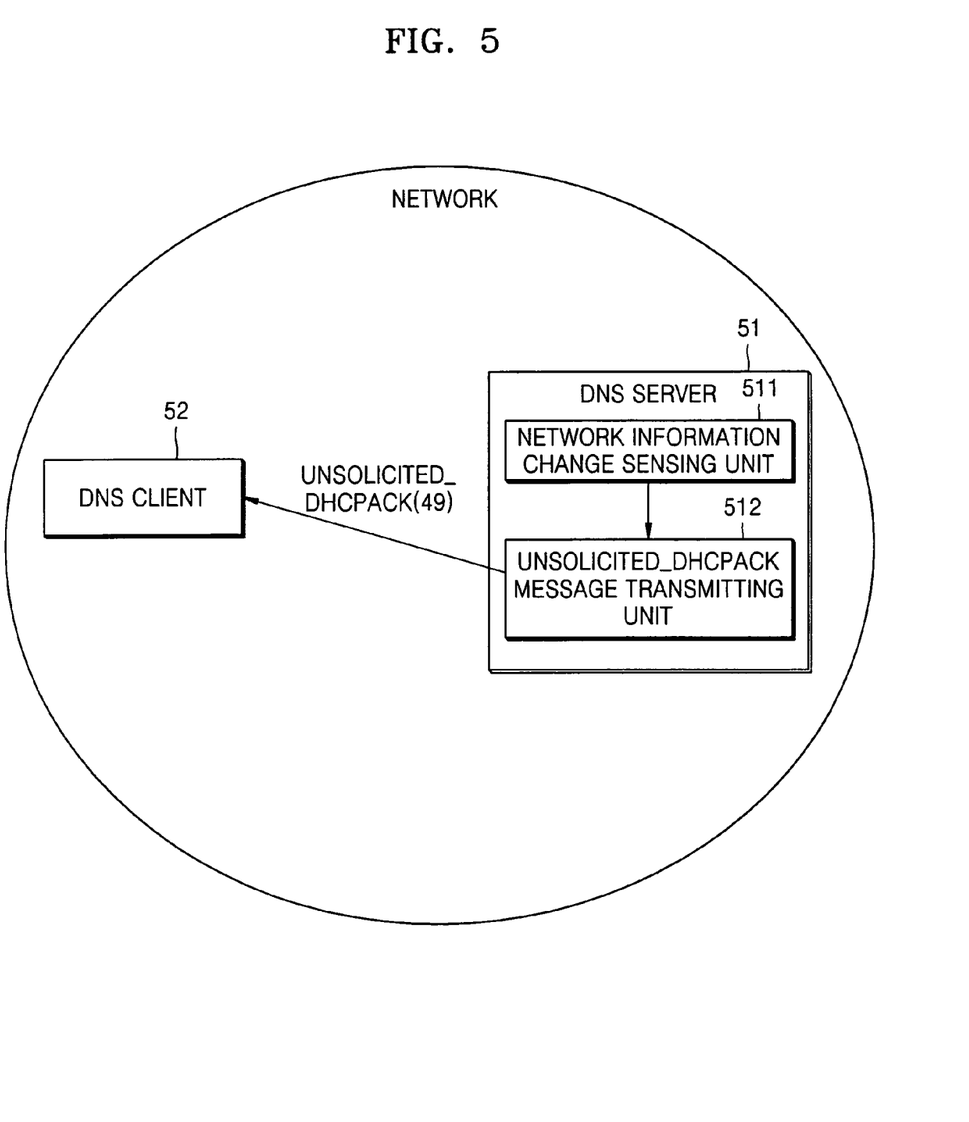
FIG. 5 is a block diagram of a DNS (domain name system) server according to an embodiment of the present invention.

FIG. 5 is a block diagram of a DNS (domain name system) server according to an embodiment of the present invention. Referring to FIG. 5, the DNS server 51 includes a network information change sensing unit 511 and an Unsolicited_DHCPACK message transmitting unit 512. The DNS server 51, which has a configuration based on an embodiment of the present invention applied to the access point C 26, provides information about a network regardless of a request from a DNS client 52.

The network information change sensing unit 511 senses changes in information about the network the DNS server 51 manages. An address of the DNS server 51 is one piece of the information about the network the DNS server manages.

When the network information change sensing unit 511 senses a change in the information, the Unsolicited_DHCPACK message transmitting unit 512 transmits an Unsolicited_DHCPACK message 49 including the changed information to the DNS client 52. For example, when the network information change sensing unit 511 senses the change in the information, the Unsolicited_DHCPACK transmitting unit 512 transmits the Unsolicited_DHCPACK message 49 including a new address of the DNS server 51 to the DNS client 52. The Unsolicited_DHCPACK message 49 indicates a DHCPACK message the DNS server 51 transmits to the DNS client 52 when the DNS server 51 has not received the DHCPREQUEST message from the DNS client 52.

However, considering security issues, any elements relevant to the security of the present embodiment can be added. For instance, a certification performing unit to perform certification and/or a DHCPREQUEST/DHCPACK repeating unit to repeatedly perform transmitting/receiving DHCPREQUEST and DHCPACK messages can be added.

As described above, according to the present embodiment, when changes in the information of the network occur, the DNS client 52 can immediately obtain the changed information without an additional request.

Figure 6:
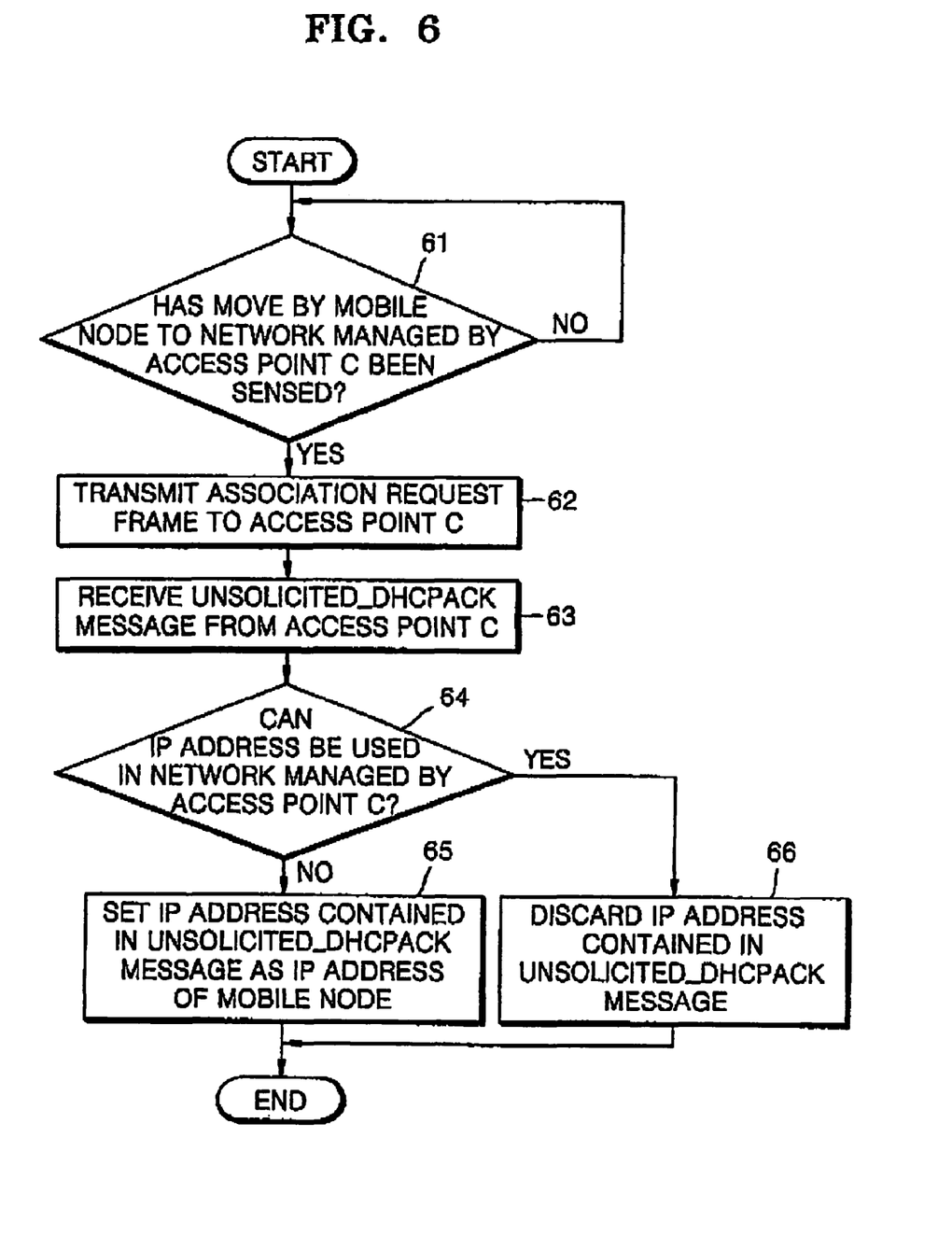
FIG. 6 is a flowchart illustrating a method of acquiring an address according to an embodiment of the present invention.

FIG. 6 is a flowchart illustrating a method of acquiring an address according to an embodiment of the present invention. The method of acquiring an address may be performed by the mobile node 12 illustrated in FIG. 3. Accordingly, the above description related to the mobile node 12 is applied to the following description of the method of acquiring an address. However, it is to be understood that the method may be performed by nodes of other configurations.

Referring to FIGS. 3 and 6, in operation 61, the mobile node 12 senses that the mobile node 12 has moved from a network the access point B 25 manages to a network the access point C 26 manages.

In operation 62, after sensing the change of the network, the mobile node 12 transmits an association request frame 47 requesting association with the network the access point C 26 manages to the access point C 26.

In operation 63, the mobile node 12 receives an Unsolicited_DHCPACK message 48 containing an IP address which is assigned to the mobile node 12 by the access point C 26 having received the association request frame 47. The Unsolicited_DHCPACK message 48 indicates a DHCPACK message which is transmitted from the access point C 26 to the mobile node 12 when the mobile node 12 has not transmitted a DHCPREQUEST message to the access point C 26.

In operation 64, the mobile node 12 checks whether or not an IP address of the network the access point B 25 manages can be used in the network the access point C 26 manages.

In operation 65, when it is confirmed that the IP address of the network the access point B 25 manages cannot be used in the network the access point C 26 manages in operation 64, the mobile node 12 sets the IP address contained in the Unsolicited_DHCPACK message 48 received in operation 63 as the IP address of the mobile node 12. That is, in operation 65, when, in operation 64, it is determined that subnet of the IP address of the network the access point B 25 manages is different from the subnet of an IP address recorded in a yiaddr field 59 of the Unsolicited_DHCPACK message 48, the mobile node 12 sets the IP address recorded in the yiaddr field 59 of the Unsolicited_DHCPACK message 48 as the new IP address of the mobile node 12.

In operation 66, when it is confirmed that the IP address of the network the access point B 25 manages can be used in the network the access point C 26 manages in operation 64, the mobile node 12 discards the IP address contained in the Unsolicited_DHCPACK message 48 which was received in operation 63. That is, in operation 66, when, in operation 64, it is confirmed that the subnet of the IP address of the network the access point B 25 manages is identical to the subnet of the IP address recorded in the yiaddr field 59 of the Unsolicited_DHCPACK message 48, the mobile node 12 discards the IP address recorded in the yiaddr field 59 of the Unsolicited_DHCPACK message 48.

Figure 7:
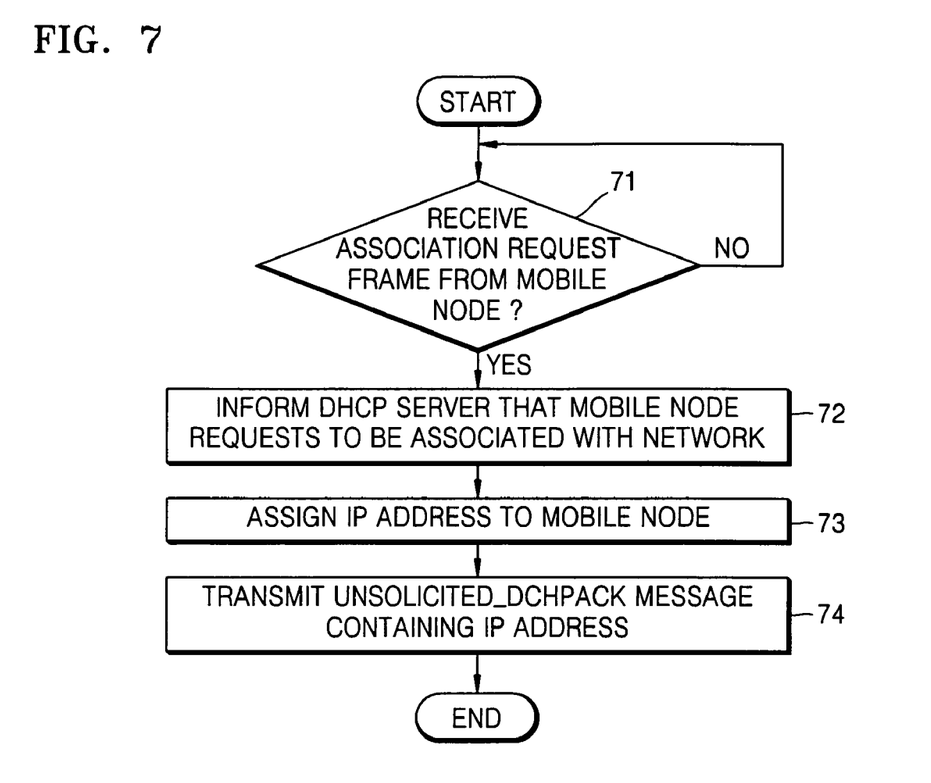
FIG. 7 is a flowchart illustrating a method of providing an address according to an embodiment of the present invention.

FIG. 7 is a flowchart illustrating a method of providing an address according to an embodiment of the present invention. The method of providing an address may be performed by the access point C 26 illustrated in FIG. 3. Accordingly, the above description related to the access point C 26 is applied to the following description of the method of providing an address. However, it is to be understood that the method may be performed by access points of other configurations.

Referring to FIGS. 3 and 7, in operation 71, the access point C 26 receives an association request frame 47 requesting to associate with a network the access point C 26 manages from the mobile node 12 moving from a network the access point B 25 to the network the access point C 26 manages.

In operation 72, after receiving the association request frame, the access point C 26 informs a DHCP server layer, which is an upper layer, that the mobile node 12 requests to be associated with the network the access point C 26 manages.

In operation 73, when the access point C 26 is informed by the link layer, which is a lower layer, of the request in operation 72, the access point C 26 assigns an IP address of the network the access point C 26 manages to the mobile node 12.

In operation 74, the access point C 26 transmits the Unsolicited_DHCPACK message 48 containing the IP address assigned in operation 73 to the mobile node 12. The Unsolicited_DHCPACK message 48 indicates a DHCPACK message which is transmitted from the access point C 26 to the mobile node 12 when the access point C 26 has not received a DHCPREQUEST message from the mobile node 12.

Figure 8:
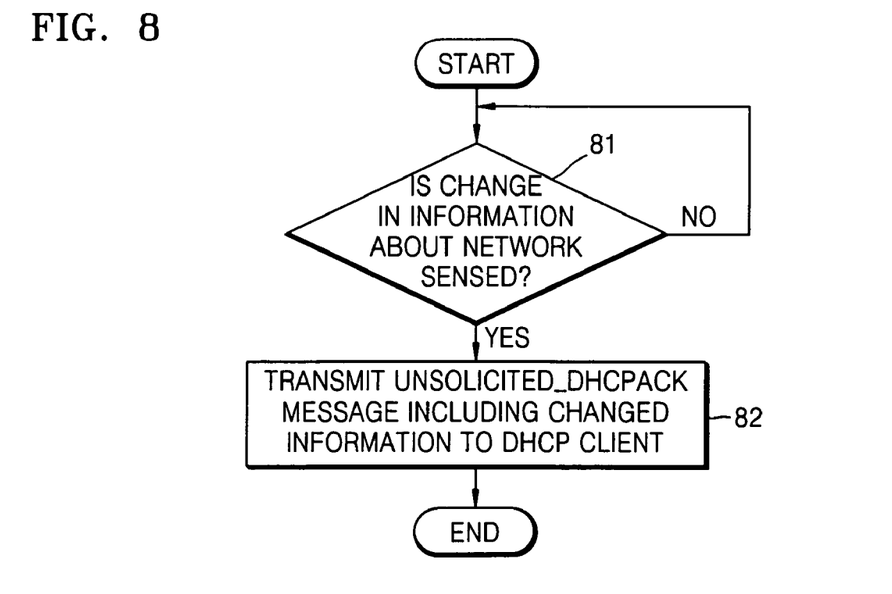
FIG. 8 is a flowchart illustrating a method of providing network information according to an embodiment of the present invention.

FIG. 8 is a flowchart illustrating a method of providing network information according to an embodiment of the present invention. The method of providing network information may be performed by the DNS server 51 illustrated in FIG. 5. Accordingly, the above description related to the DNS server 51 is applied to the method of providing network information. However, it is to be understood that the method may be performed by servers of other configurations.

Referring to FIGS. 5 and 8, in the operation 81, the DNS server 51 senses a change in information about a network managed by the DNS server 51. An example of the information about a network managed by the DNS server 51 is an address of the DNS server 51.

In operation 82, when a change in information about a network managed by the DNS server 51 has been sensed, the DNS server 51 transmits an Unsolicited_DHCPACK message 49 including the changed information to a DNS client 52. For example, in operation 82, when a change in the address of the DNS server 51 has been sensed in operation 81, the DNS server 51 transmits the Unsolicited_DHCPACK message 49 including the changed address of the DNS server 51 to the DNS client 52. The Unsolicited_DHCPACK message 49 indicates a DHCPACK message which is transmitted from the DNS server 51 to the DNS client 52 when the DNS server has not received a DHCPREQUEST message from the DNS client 52.

Embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMS, or DVDs).

According to the above-described embodiments of the present invention, since a mobile node can receive an Unsolicited_DHCPACK message containing an IP address without an address request, the mobile node can immediately acquire an IP address required when the mobile node moves between networks, thereby allowing prompt setting of an IP address. Further, according to the present invention, since an access point corresponding to a DHCP server can transmit an Unsolicited_DHCPACK message without a request by a mobile node corresponding to a DHCP client, the access point can independently assign an address.

In addition, according to the above-described embodiments of the present invention, since a mobile node can receive an Unsolicited_DHCPACK message including information about a network without an additional request, when a change in information about a network occurs, the mobile node can immediately obtain the changed information. The mobile node obtains information about an IP address and a network immediately, and therefore a high-speed communication environment can be realized.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of acquiring an address, comprising:
    sensing that a mobile node has moved from a first network to a second network;
    transmitting a frame requesting association with the second network to an access point managing the second network after sensing that the mobile node has moved from the first network to the second network;
    receiving a message, which is processed at an upper layer separate from a link layer of processing association with the second network, containing an address assigned to the mobile node from the access point having received the transmitted frame,
    wherein the message includes a code in an UNSOLICITED DHCPACK field indicating that the message is an Unsolicited DHCPACK message that the mobile node receives from the access point when the mobile node has not transmitted a DHCPREQUEST message to the access point.

2. The method of claim 1, further comprising:
    setting the address contained in the received message as an address of the mobile node.

3. The method of claim 2, wherein, in the setting, when an address of the first network cannot be used in the second network, the address contained in the message is set as the address of the mobile node.

4. The method of claim 1, wherein the frame is an association request frame or a reassociation request frame defined by the Institute of Electrical and Electronics Engineers (IEEE) 802.11 wireless LAN standard and the address is an Internet protocol (IP) address.

5. The method of claim 1, further comprising:
    determining whether the address assigned to the mobile node from the access point can be used by the second network at the mobile node;
    setting the address contained in the received message as address of the mobile node when address of the mobile node provided by the first network cannot be used in the second network at the mobile node; and
    discarding the address contained in the received message when address of mobile node provided by the first network can be used in the second network at the mobile node.

6. The method of claim 5, wherein: the Unsolicited_DHCPACK message comprises a YIADDR field; wherein, in the setting, when address of the first network is different from address stored in YIADDR field of Unsolicited DHCPACK message, the address contained in the YIADDR field of the Unsolicited DHCPACK message is set as the address of the mobile node; and wherein, in the discarding, when address of first network is same as address stored in YIADDR field of the Unsolicited DHCPACK message, the address contained in the YIADDR field of the Unsolicited DHCPACK message is discarded.

7. A mobile node comprising:
    a network change sensing unit to sense when the mobile node has moved from a first network to a second network;
    a frame transmitting unit to transmit a frame requesting association with the second network to an access point managing the second network when the network change sensing unit senses that the mobile node has moved from the first network to the second network; and a message receiving unit to receive a message, which is processed at an upper layer separate from a link layer of processing association with the second network, containing an address to be assigned to the mobile node from the access point having received the frame transmitted by the frame transmitting unit, wherein the message includes a code in an UNSOLICITED DHCPACK field indicating that the message is an Unsolicited DHCPACK message that the mobile node receives from the access point when the mobile node has not transmitted a DHCPREQUEST message to the access point.

8. The mobile node of claim 7, further comprising:

an IP address setting unit to determine whether the address assigned to the mobile node from the access point can be used by the second network at the mobile node, to set the address contained in the received message as address of the mobile node when address of the mobile node provided by the first network cannot be used in the second network at the mobile node, and to discard the address contained in the received message when address of mobile node provided by the first network can be used in the second network at the mobile node.

9. A non-transitory computer-readable recording medium having embodied thereon a computer program executable by a computer to perform a method of acquiring an address, the method comprising:

sensing that a mobile node moves from a first network to a second network;

transmitting a frame requesting association with the second network to an access point managing the second network after sensing that the mobile node has moved from the first network to the second network;

receiving a message, which is processed at an upper layer separate from a link layer of processing association with the second network, containing an address assigned to the mobile node from the access point having received the transmitted frame, wherein the message includes a code in an UNSOLICITED DHCPACK field indicating that the message is an Unsolicited DHCPACK message that the mobile node receives from the access point when the mobile node has not transmitted a DHCPREQUEST message to the access point.

10. The non-transitory computer readable medium of claim 9, further comprising:

determining whether the address assigned to the mobile node from the access point can be used by the second network at the mobile node;

setting the address contained in the received message as address of the mobile node when address of the mobile node provided by the first network cannot be used in the second network at the mobile node; and discarding the address contained in the received message when address of mobile node provided by the first network can be used in the second network at the mobile node.

11. A method of providing an address, comprising:

receiving a frame requesting association with a second network from a mobile node which has moved from a first network to the second network;

assigning an address of the second network to the mobile node when the frame is received; and transmitting a message, which is processed at an upper layer separate from a link layer of processing association with the second network, containing the assigned address to the mobile node, wherein the message includes a code in an UNSOLICITED DHCPACK field indicating that the message is an Unsolicited DHCPACK message that an access point managing the second network transmits to the mobile node when the access point has not received a DHCPREQUEST message from the mobile node.

12. The method of claim 11, further comprising:

informing an upper layer of an access point managing the second network that the mobile node has requested to be associated with the second network when the frame is received, wherein, in the assigning, the address of the second network is assigned to the mobile node when the access point is informed by a lower layer of the access point that the mobile node has requested to be associated with the second network.

13. The method of claim 11, wherein the frame is an association request frame or a reassociation request frame defined by the Institute of Electrical and Electronics Engineers (IEEE) 802.11 wireless LAN standard and the address is an Internet Protocol (IP) address.

14. An access point comprising:

a frame receiving unit to receive a frame requesting association with a second network from a mobile node which has moved from a first network to the second network;

an address assigning unit to assign an address of the second network to the mobile node when the frame receiving unit receives the frame; and a message transmitting unit to transmit a message, which is processed at an upper layer separate from a link layer of processing association with the second network, containing the address assigned by the address assigning unit to the mobile node, wherein the message includes a code in an UNSOLICITED DHCPACK field indicating that the message is an Unsolicited DHCPACK message that the access point managing the second network transmits to the mobile node when the access point has not received a DHCPREQUEST message from the mobile node.

15. A non-transitory computer-readable recording medium having embodied thereon a computer program executable by a computer to perform a method of acquiring an address, the method comprising:

receiving a frame requesting association with a second network from a mobile node which has moved from a first network to the second network;

assigning an address of the second network to the mobile node when the frame is received; and transmitting a message, which is processed at an upper layer separate from a link layer of processing association with the second network, containing the assigned address to the mobile node, wherein the message includes a code in an UNSOLICITED DHCPACK indicating that the message is an Unsolicited DHCPACK message that an access point managing the second network transmits to the mobile node when the access point has not received a DHCPREQUEST message from the mobile node.

16. A communication system comprising:

a mobile node sensing when the mobile node has moved from a first network to a second network and transmitting a frame requesting association with the second network to an access point managing the second network when the mobile node has sensed that the mobile node has moved from the first network to the second network; and an access point assigning an address of the second network to the mobile node in response to the frame received from the mobile node and transmitting a message, which is processed at an upper layer separate from a link layer of processing association with the second network, containing the assigned address to the mobile node, wherein the message includes a code in an UNSOLICITED DHCPACK field indicating that the message is an unsolicited DHCPACK message that the access point managing the second network transmits to the mobile node when the access point has not received a DHCPREQUEST message from the mobile node.

17. The communication system of claim 16, wherein the mobile node receives the message from the access point and sets the address contained in the received message as an address of the mobile node.

18. A method of providing network information, comprising:

sensing a change of information about a specified network; and transmitting a message, which is processed at an upper layer separate from a link layer of processing association with the specified network, including the changed information to a client when the change is sensed, wherein the message includes a code in an UNSOLICITED DHCPACK field indicating that the message is an Unsolicited DHCPACK message that a server transmits to the client when the server has not received a DHCPREQUEST message from the client.

19. The method of claim 18, wherein the information is an address of a domain name system (DNS) server.

20. A non-transitory computer-readable recording medium having embodied thereon a computer program executable by a computer to perform a method of providing network information, the method comprising:

sensing a change of information about a specified network; and transmitting a message, which is processed at an upper layer separate from a link layer of processing association with the specified network, including the changed information to a client when the change is sensed, wherein the message includes a code in an UNSOLICITED DHCPACK field indicating that the message is an Unsolicited DHCPACK message that a server transmits to the client when the server has not received a DHCPREQUEST message from the client.

* * * * *

UNITED STATES PATENT AND TRADEMARK OFFICE
CERTIFICATE OF CORRECTION

PATENT NO. : 7,990,936 B2  
APPLICATION NO. : 11/212783  
DATED : August 2, 2011  
INVENTOR(S) : Soo-hong Park et al.

Page 1 of 1

It is certified that error appears in the above-identified patent and that said Letters Patent is hereby corrected as shown below:

Title Page Column 1 (Inventors), Line 3, Delete "Icheon" and insert -- Incheon --, therefor.

Title Page Column 2 (Other Publications), Line 2, After "200510095855.8." insert -- dated November 7, 2008 --.

Column 10, Line 35, In Claim 4, delete "protocol" and insert -- Protocol --, therefor.

Column 11, Line 45, In Claim 10, delete "computer readable" and insert -- computer-readable --, therefor.

Signed and Sealed this
Nineteenth Day of June, 2012

David J. Kappos
*Director of the United States Patent and Trademark Office*